US012179335B2

(12) United States Patent
Fedrigon et al.

(10) Patent No.: US 12,179,335 B2
(45) Date of Patent: Dec. 31, 2024

(54) STORAGE SYSTEM AND CONTAINER FOR SAME

(71) Applicant: TECHTRONIC CORDLESS GP, Anderson, SC (US)

(72) Inventors: Jeremy Fedrigon, Greenville, SC (US); Wai Yip Siu, Dongguan (CN); Gai She Zhang, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 38 days.

(21) Appl. No.: 17/863,185

(22) Filed: Jul. 12, 2022

(65) Prior Publication Data

US 2024/0017392 A1 Jan. 18, 2024

(51) Int. Cl.

*B65D 25/22* (2006.01)
*B25H 3/02* (2006.01)
*B25H 3/04* (2006.01)
*B25H 3/00* (2006.01)

(52) U.S. Cl.

CPC ............... *B25H 3/04* (2013.01); *B25H 3/025* (2013.01); *B25H 3/003* (2013.01)

(58) Field of Classification Search

CPC .......... B25H 3/04; B25H 3/025; B25H 3/003; B25H 1/02; B25H 3/02; B25H 3/06; E05C 3/008; E05C 5/02; E05C 1/002; B65D 25/2835; B65D 25/2844; B65D 25/285; B65D 11/10; B65D 11/1886;

(Continued)

(56) References Cited

U.S. PATENT DOCUMENTS

| | | | |
|---|---|---|---|
| 2,541,828 | A | 2/1951 | Peck |
| 2,695,105 | A | 11/1954 | Mitchell |
| 3,069,019 | A | 12/1962 | Schuster |

(Continued)

FOREIGN PATENT DOCUMENTS

| | | | |
|---|---|---|---|
| AU | 2015101015 B4 | 9/2015 | |
| AU | 2020203900 A1 | 7/2020 | |

(Continued)

OTHER PUBLICATIONS

European Search Report Corresponding with Application No. EP22184378 on Apr. 14, 2023 (2 pages).

(Continued)

*Primary Examiner* — Luan K Bui

(74) *Attorney, Agent, or Firm* — Dority & Manning, P.A.

(57) ABSTRACT

A storage system includes a panel secured to a support surface and a storage container removably supported on the panel. The panel includes a plurality of cleats. The storage container includes a first container portion, a second container portion, and a support feature engageable with the cleats. The second container portion and the first container portion are pivotably movable between a closed position and an open position. The support feature includes a first partial mounting portion and a second partial mounting portion. The second partial mounting portion is movable between a stowed position and an extended position. The first partial mounting portion and the second partial mounting portion cooperate to provide a mounting interface to engage the cleats while the second partial mounting portion is in the extended position.

21 Claims, 5 Drawing Sheets

(58) Field of Classification Search
CPC .... B65D 11/188; B65D 11/105; B65D 25/22; B65D 43/16; B65D 43/22
USPC ...... 206/372, 373, 379; 211/85.17; 220/476, 220/480
See application file for complete search history.

(56) References Cited

U.S. PATENT DOCUMENTS

| | | | |
|---|---|---|---|
| 3,504,405 A | 4/1970 | Elliot-Smith | |
| 3,791,528 A | 2/1974 | Brendgord | |
| 3,860,309 A | 1/1975 | Brendgord | |
| 3,983,976 A | 10/1976 | Taylor | |
| 4,119,285 A | 10/1978 | Bisping et al. | |
| 4,228,906 A | 10/1980 | Jones | |
| 4,304,447 A | 12/1981 | Ellwood et al. | |
| 4,322,006 A | 3/1982 | Marschak | |
| 4,349,113 A | 9/1982 | Schreiner | |
| 4,413,736 A | 11/1983 | Nibling | |
| 4,552,272 A | 11/1985 | Field | |
| 4,917,244 A | 4/1990 | Sayers | |
| 4,993,583 A | 2/1991 | Chasen | |
| 5,035,389 A * | 7/1991 | Wang | F16M 11/041 248/225.11 |
| 5,226,625 A | 7/1993 | Hanna | |
| 5,359,752 A | 11/1994 | Domenig | |
| 5,472,167 A | 12/1995 | Shillington et al. | |
| 5,503,277 A | 4/1996 | O'Brien | |
| 5,524,915 A * | 6/1996 | Liu | B25H 3/023 280/30 |
| 5,601,196 A | 2/1997 | Heer et al. | |
| 5,669,515 A | 9/1997 | Tisbo et al. | |
| 5,799,915 A | 9/1998 | Morey | |
| 5,947,322 A | 9/1999 | Ho | |
| 6,499,608 B1 | 12/2002 | Sterling et al. | |
| 6,564,949 B1 * | 5/2003 | Saathoff | B25H 3/006 211/94.01 |
| 6,811,043 B2 | 11/2004 | Perkins et al. | |
| 6,868,967 B2 * | 3/2005 | Lam | A45C 13/02 206/372 |
| 6,926,160 B2 | 8/2005 | Perkins et al. | |
| 7,055,703 B2 | 6/2006 | Perkins et al. | |
| 7,097,063 B2 | 8/2006 | Tucker et al. | |
| 7,097,066 B2 | 8/2006 | Tucker et al. | |
| 7,147,115 B2 | 12/2006 | Perkins et al. | |
| 7,228,977 B2 | 6/2007 | Perkins et al. | |
| 7,296,695 B2 | 11/2007 | Perkins et al. | |
| 7,401,698 B2 * | 7/2008 | Dost | A45C 13/1084 206/349 |
| 7,428,972 B2 | 9/2008 | Warner et al. | |
| D624,317 S | 9/2010 | Wenchel et al. | |
| 8,020,819 B2 | 9/2011 | Crow et al. | |
| 8,061,539 B2 | 11/2011 | Punzel et al. | |
| 8,191,845 B1 | 6/2012 | Yu | |
| 8,267,245 B2 | 9/2012 | Kotula et al. | |
| 8,505,729 B2 | 8/2013 | Sosnovsky et al. | |
| 8,534,623 B2 | 9/2013 | Crow et al. | |
| 8,573,415 B2 | 11/2013 | Ernst et al. | |
| 8,602,217 B2 | 12/2013 | Sosnovsky et al. | |
| 8,833,596 B2 | 9/2014 | Sanguinet et al. | |
| 8,875,888 B2 | 11/2014 | Koenig et al. | |
| 8,915,382 B2 * | 12/2014 | Totman | A47F 5/0838 |
| 8,967,438 B2 | 3/2015 | Russell et al. | |
| 9,206,827 B2 | 12/2015 | Loree et al. | |
| 9,386,865 B2 | 7/2016 | Bally | |
| 9,389,012 B2 | 7/2016 | Rackley et al. | |
| 9,393,684 B2 | 7/2016 | Christopher et al. | |
| 9,398,819 B2 | 7/2016 | Tsai et al. | |
| 9,415,504 B2 | 8/2016 | Chen | |
| 9,642,475 B2 * | 5/2017 | Vogler | A47F 5/0846 |
| 9,676,518 B2 | 6/2017 | Shamp et al. | |
| 9,874,393 B2 | 1/2018 | Rackley et al. | |
| 9,980,582 B1 | 5/2018 | Levy et al. | |
| RE47,022 E | 9/2018 | Sosnovsky et al. | |
| 10,138,032 B2 | 11/2018 | Chang | |
| 10,179,672 B2 | 1/2019 | Kuhls et al. | |
| 10,287,057 B2 | 5/2019 | Nilsson et al. | |
| 10,293,477 B2 | 5/2019 | Wolle et al. | |
| 10,413,092 B2 | 9/2019 | Winnard | |
| 10,492,631 B2 | 12/2019 | Velderman et al. | |
| 10,589,416 B1 * | 3/2020 | Hsieh | F16B 2/22 |
| 10,716,413 B2 | 7/2020 | Winnard | |
| 10,722,012 B2 | 7/2020 | Kraus et al. | |
| 10,925,412 B2 | 2/2021 | Velderman et al. | |
| 10,959,544 B2 | 3/2021 | Winnard | |
| 11,006,749 B2 | 5/2021 | Anderson et al. | |
| 11,014,716 B2 | 5/2021 | Tyler et al. | |
| 11,084,163 B2 | 8/2021 | Strempke et al. | |
| 11,155,382 B1 | 10/2021 | Cai | |
| 11,883,946 B2 * | 1/2024 | La Vardera | B25H 3/04 |
| 2004/0026934 A1 * | 2/2004 | Boda | A47B 96/06 292/256 |
| 2004/0207298 A1 | 10/2004 | Rodon et al. | |
| 2005/0224384 A1 * | 10/2005 | Sands | A61B 50/34 206/370 |
| 2005/0269276 A1 | 12/2005 | Pfeiffer | |
| 2006/0037964 A1 * | 2/2006 | Su | B65D 25/2841 220/826 |
| 2006/0065658 A1 * | 3/2006 | Brunson | B65D 50/046 220/503 |
| 2006/0131472 A1 * | 6/2006 | Lee | B25H 3/003 248/682 |
| 2006/0201837 A1 * | 9/2006 | Lin | B25H 3/003 206/379 |
| 2007/0125731 A1 | 6/2007 | Waterman | |
| 2008/0000853 A1 | 1/2008 | Huang | |
| 2008/0006592 A1 | 1/2008 | Brooks | |
| 2008/0054142 A1 | 3/2008 | Deland | |
| 2008/0169739 A1 * | 7/2008 | Goldenberg | B25H 3/04 312/244 |
| 2009/0145866 A1 | 6/2009 | Panosian et al. | |
| 2009/0236250 A1 * | 9/2009 | Wang | B25H 3/003 220/784 |
| 2010/0117495 A1 | 5/2010 | Cornell | |
| 2011/0062295 A1 | 3/2011 | Totman | |
| 2011/0139777 A1 | 6/2011 | Sosnovsky et al. | |
| 2011/0234072 A1 | 9/2011 | Hightower | |
| 2012/0012726 A1 | 1/2012 | Daniels | |
| 2012/0074158 A1 * | 3/2012 | Lafleur | B65D 43/164 220/810 |
| 2012/0228300 A1 | 9/2012 | Wertman | |
| 2012/0267374 A1 | 10/2012 | Kotula et al. | |
| 2013/0047386 A1 * | 2/2013 | Barfoot | A47F 5/0838 24/580.1 |
| 2013/0062480 A1 * | 3/2013 | Kao | B25H 3/04 248/300 |
| 2013/0284773 A1 * | 10/2013 | Meng | B25H 3/003 206/349 |
| 2014/0263119 A1 | 9/2014 | Gruger et al. | |
| 2015/0329251 A1 | 11/2015 | Sanguinet et al. | |
| 2016/0008973 A1 * | 1/2016 | Bensman | B65D 43/16 206/372 |
| 2016/0066710 A1 | 3/2016 | Bally | |
| 2016/0236342 A1 * | 8/2016 | Evatt | B25H 3/003 |
| 2017/0274522 A1 | 9/2017 | Kao | |
| 2018/0220758 A1 | 8/2018 | Burchia | |
| 2019/0106244 A1 * | 4/2019 | Brunner | A45C 7/005 |
| 2019/0168376 A1 * | 6/2019 | Brocket | B65D 21/02 |
| 2019/0225371 A1 | 7/2019 | Hoppe et al. | |
| 2020/0118065 A1 | 4/2020 | Li et al. | |
| 2020/0230801 A1 * | 7/2020 | Moradi | B25H 3/003 |
| 2020/0299504 A1 | 9/2020 | Munoz | |
| 2021/0112998 A1 | 4/2021 | Gargano | |
| 2021/0127855 A1 | 5/2021 | Velderman et al. | |
| 2021/0147113 A1 | 5/2021 | Workman | |
| 2021/0155373 A1 | 5/2021 | Cai | |
| 2021/0245359 A1 * | 8/2021 | Hohl | B25H 3/003 |
| 2021/0245360 A1 | 8/2021 | Hohl | |
| 2021/0252690 A1 | 8/2021 | Strempke et al. | |
| 2021/0357999 A1 * | 11/2021 | Caraway | A47G 25/06 |
| 2022/0117393 A1 * | 4/2022 | Jenkins | B25H 3/04 |
| 2023/0013694 A1 * | 1/2023 | Evatt | B65D 43/22 |

(56) References Cited

U.S. PATENT DOCUMENTS

| | | | | |
|---|---|---|---|---|
| 2023/0182281 | A1 * | 6/2023 | Keller | B25H 3/04 211/26 |
| 2023/0270266 | A1 * | 8/2023 | Paprocki | A47F 5/0853 211/94.01 |
| 2023/0330833 | A1 * | 10/2023 | Keller | B25H 3/04 |
| 2023/0361585 | A1 * | 11/2023 | Irwin | A47B 47/0091 |

FOREIGN PATENT DOCUMENTS

| | | | | | |
|---|---|---|---|---|---|
| AU | 2019283962 | A1 | | 8/2021 | |
| AU | 2022202334 | A1 | * | 10/2022 | B25H 3/003 |
| CN | 203228220 | U | | 10/2013 | |
| CN | 203427004 | U | | 2/2014 | |
| CN | 203427005 | U | | 2/2014 | |
| CN | 203919013 | U | | 11/2014 | |
| CN | 204819447 | U | | 12/2015 | |
| CN | 205766046 | U | | 12/2016 | |
| CN | 205799447 | U | | 12/2016 | |
| CN | 205950695 | U | | 2/2017 | |
| CN | 206185841 | U | | 5/2017 | |
| CN | 210064056 | U | | 2/2020 | |
| CN | 210307728 | U | | 4/2020 | |
| CN | 210335895 | U | | 4/2020 | |
| CN | 211392067 | U | | 9/2020 | |
| CN | 211392068 | U | | 9/2020 | |
| CN | 211615552 | U | | 10/2020 | |
| CN | 211639851 | U | | 10/2020 | |
| CN | 212399523 | U | | 1/2021 | |
| CN | 212763410 | U | | 3/2021 | |
| CN | 213562493 | U | | 6/2021 | |
| CN | 113071811 | A | | 7/2021 | |
| CN | 213616623 | U | | 7/2021 | |
| CN | 213703360 | U | | 7/2021 | |
| CN | 215968664 | U | * | 3/2022 | B25H 3/003 |
| CN | 115592637 | A | * | 1/2023 | B25H 1/02 |
| DE | 1037956 | B | * | 9/1955 | B25H 3/00 |
| DE | 2334362 | B1 | | 9/1974 | |
| DE | 3823142 | A1 | | 1/1990 | |
| DE | 9109789 | U1 | * | 8/1991 | B25H 3/02 |
| DE | 9206394 | U1 | | 7/1992 | |
| DE | 29913188 | U1 | * | 11/1999 | B25H 3/003 |
| DE | 20314773 | U1 | | 12/2003 | |
| DE | 202004016510 | U1 | | 1/2005 | |
| DE | 102004027581 | A1 | * | 12/2005 | B25F 5/029 |
| DE | 202008013258 | U1 | | 1/2009 | |
| DE | 202011050729 | U1 | * | 12/2011 | B25H 3/003 |
| DE | 202013005194 | U1 | | 6/2013 | |
| DE | 202014100082 | U1 | * | 6/2014 | B25H 3/003 |
| DE | 202014009931 | U1 | | 3/2015 | |
| DE | 102014111337 | A1 | | 10/2015 | |
| DE | 102011110636 | B4 | | 1/2017 | |
| DE | 202016103774 | U1 | | 10/2017 | |
| DE | 202017106619 | U1 | * | 2/2018 | B25H 3/00 |
| DE | 102016218116 | A1 | | 3/2018 | |
| DE | 202019104499 | U1 | | 9/2019 | |
| DE | 202019105716 | U1 | | 12/2019 | |
| DE | 102018214160 | A1 | | 2/2020 | |
| DE | 102018214925 | A1 | | 3/2020 | |
| DE | 102020200963 | A1 | | 7/2021 | |
| DE | 202021102543 | U1 | | 7/2021 | |
| DE | 102020205607 | A1 | | 11/2021 | |
| EP | 3067160 | A1 | | 9/2016 | |
| EP | 3159115 | A2 | | 4/2017 | |
| EP | 3593955 | A1 | | 1/2020 | |
| EP | 4183528 | A1 | * | 5/2023 | B25H 1/02 |
| EP | 3988251 | B1 | * | 8/2023 | A47B 81/00 |
| GB | 2486262 | A | | 6/2012 | |
| GB | 2582851 | A | | 10/2020 | |
| GB | 2585747 | A | | 1/2021 | |
| TW | I517946 | B | | 1/2016 | |
| TW | I639491 | B | | 11/2018 | |
| WO | WO-2006047785 | A2 | * | 5/2006 | B25H 3/023 |
| WO | WO2010084309 | A1 | | 7/2010 | |
| WO | WO2014072682 | A1 | | 5/2014 | |
| WO | WO-2019214843 | A1 | * | 11/2019 | B21D 37/04 |
| WO | WO2020052783 | A1 | | 3/2020 | |
| WO | WO-2020131269 | A1 | * | 6/2020 | B25H 3/003 |
| WO | WO2021000525 | A1 | | 1/2021 | |
| WO | WO2021002756 | A1 | | 1/2021 | |
| WO | WO2021108890 | A1 | | 6/2021 | |

OTHER PUBLICATIONS

European Search Report Corresponding with Application No. EP22184245 on Apr. 21, 2023 (2 pages).

* cited by examiner

STORAGE SYSTEM AND CONTAINER FOR SAME

BACKGROUND

The present disclosure relates to storage systems, and more particularly to wall-mounted storage containers for tool accessories and the like.

Hand tools, power tools, and associated accessories such as batteries, tool bits, sockets, accessories, fasteners, and the like, may be moved frequently between a storage space and a work space. One aspect of accessibility is a user's ability to quickly store an object and remove the object from storage.

SUMMARY

In one independent aspect, a storage container includes a first container portion including a first side; a second container portion including a second side, and a support feature configured to engage a wall support system. The second side is pivotably coupled to the first side of the first container portion by a hinge. The second container portion and the first container portion are pivotably movable between a closed position and an open position. The support feature includes a first partial mounting portion and a second partial mounting portion. The first partial mounting portion is positioned on the first container portion, and the second partial mounting portion is supported for movement relative to the first partial mounting portion. The second partial mounting portion is movable between a stowed position and an extended position. The first partial mounting portion and the second partial mounting portion cooperate to provide a mounting interface configured to engage a support member while the second partial mounting portion is in the extended position.

In another independent aspect, a storage system includes a panel secured to a support surface and a storage container removably supported on the panel. The panel includes a plurality of cleats spaced apart from one another. The storage container includes a first container portion including a first side, a second container portion including a second side, and a support feature engageable with the cleats. The second side is pivotably coupled to the first side of the first container portion by a hinge. The second container portion and the first container portion are pivotably movable between a closed position and an open position. The support feature includes a first partial mounting portion and a second partial mounting portion. The first partial mounting portion is positioned on the first container portion. The second partial mounting portion is supported for movement relative to the first partial mounting portion, and the second partial mounting portion is movable between a stowed position and an extended position. The first partial mounting portion and the second partial mounting portion cooperate to provide a mounting interface to engage at least one of the cleats while the second partial mounting portion is in the extended position.

In yet another independent aspect, a storage container includes: a first container portion; a second container portion; a hinge coupling a first side of the first container portion and a second side of the second container portion for pivoting movement about a pivot axis, a latch releasably securing the first container portion and the second container portion in the closed position, a first partial mounting portion positioned on the first container portion, and a second partial mounting portion supported on the hinge for pivoting movement relative to the first partial mounting portion and the second container portion. The first container portion and the second container portion are pivotably movable between a closed position and an open position. The second partial mounting portion is movable between a stowed position and an extended position. The first partial mounting portion and the second partial mounting portion cooperate to form a mounting interface while the first container portion and the second container portion are in the closed position and the second partial mounting portion is in the extended position. The mounting interface is configured to engage the wall support system.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, whether direct or indirect. Terms of degree, such as "substantially," "about," "approximately," etc. are understood by those of ordinary skill to refer to reasonable ranges outside of the given value, for example, general tolerances associated with manufacturing, assembly, and use of the described embodiments.

DETAILED DESCRIPTION

Figure 1:
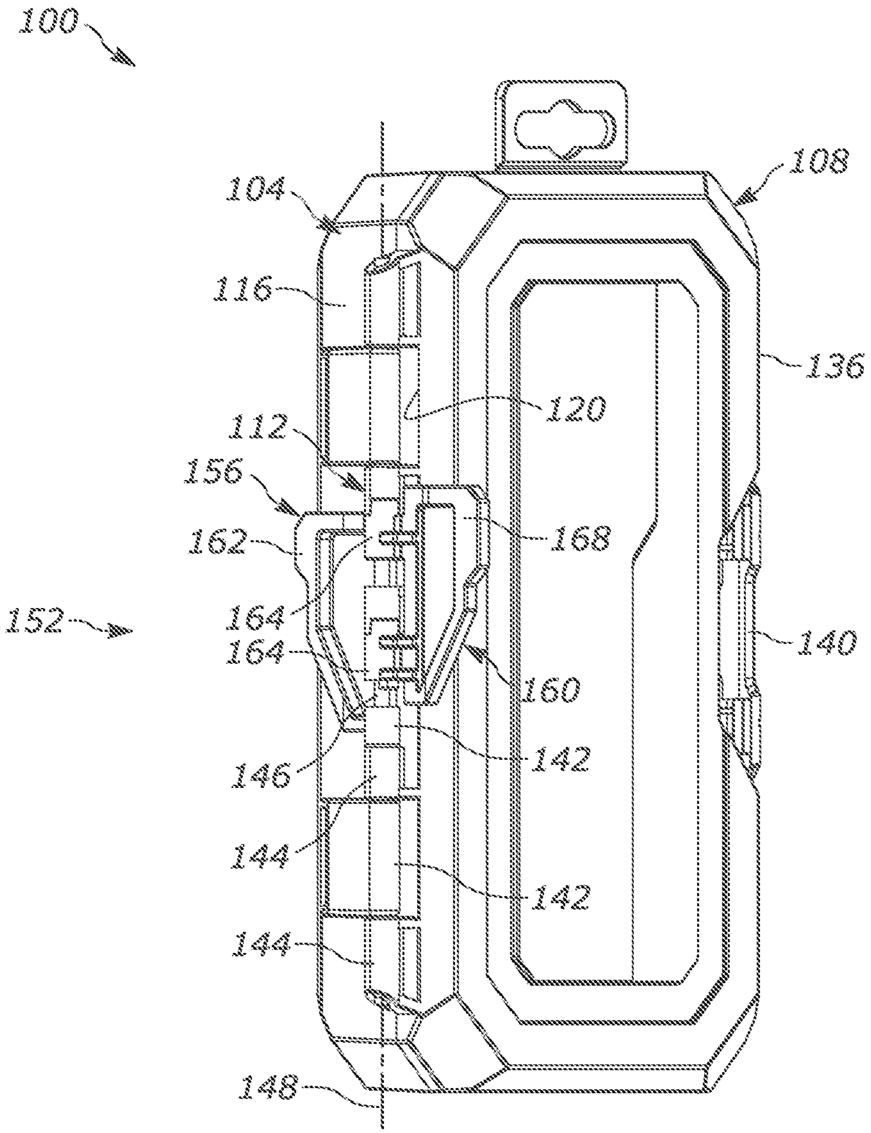
FIG. 1 is a perspective view of a storage container.
Figure 2:
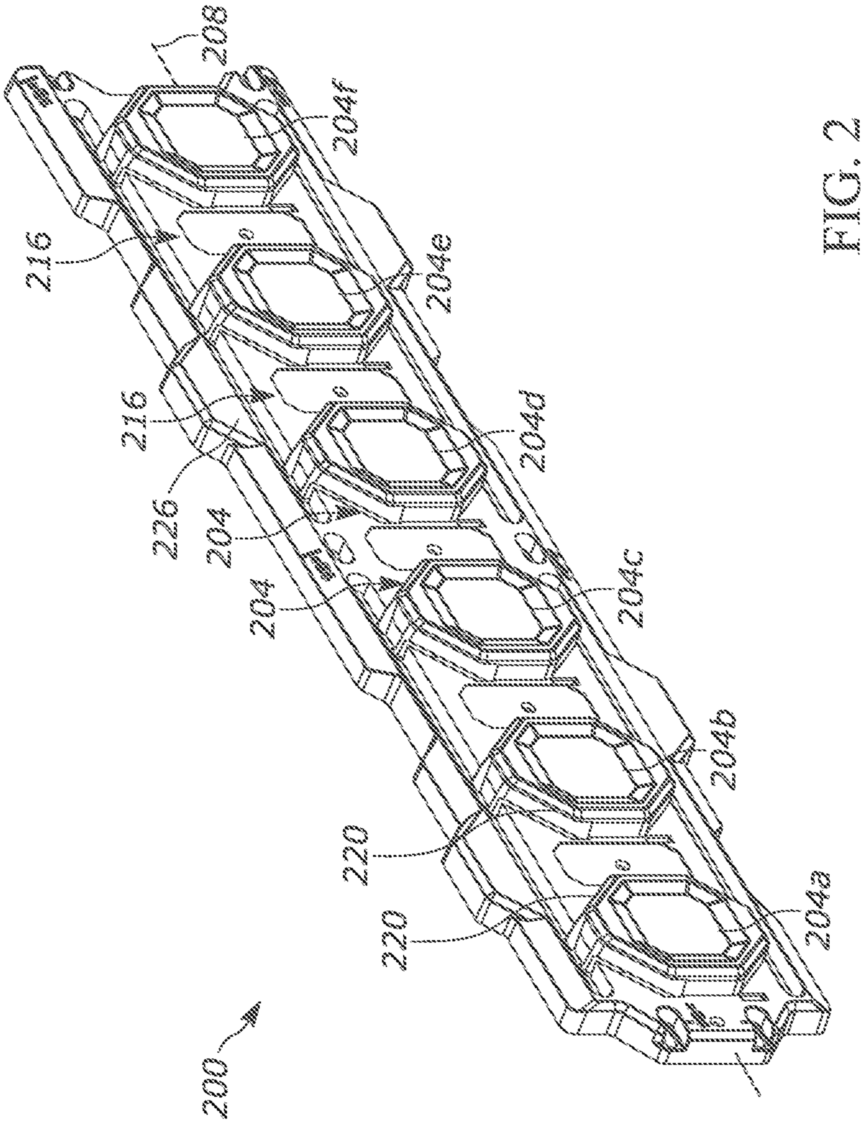
FIG. 2 is a perspective view of a support panel.
Figure 3:
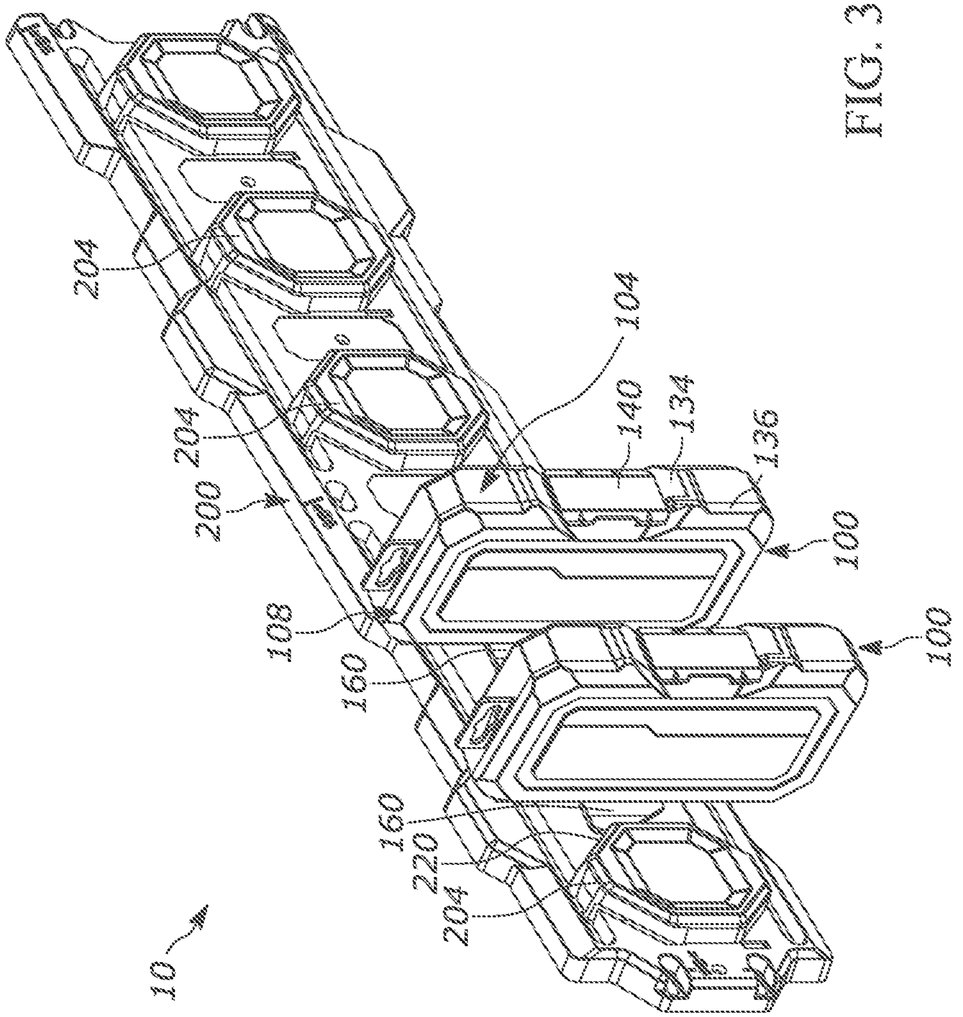
FIG. 3 is a perspective view of a storage system including the support panel of FIG. 2 supporting storage containers.

FIGS. 1-3 illustrate a storage system 10 including a storage container 100 (FIG. 1) that is engageable with and supported by a support panel 200 (FIG. 2). In the illustrated embodiment, the panel 200 supports two containers 100, but it is understood that fewer or more containers could be supported on the panel 200. Each container 100 engages the panel 200 independently of the other containers 100, and can be removed from the panel 200 independently of the other containers 100.

As shown in FIG. 2, the panel 200 includes a plurality of cleats 204 which are generally aligned and spaced apart from one another. The cleats 204 protrude from the surface of the panel 200. The panel 200 may be secured to a support surface or wall (e.g., by one or more fasteners). In the illustrated embodiment, the panel 200 is shown as a rail having a single row of six cleats 204*a*-204*f* aligned with one another in a direction parallel to a longitudinal axis 208 of the rail 200; in other embodiments, the panel may have fewer or more cleats, and/or may have multiple rows of cleats. Additionally (or alternatively), multiple panels and/or rails may be secured to the support surface adjacent the illustrated rail 200. In the illustrated embodiment, the rail 200 includes extension features 226 positioned on each edge, and adjacent rails have complementary extension features to facilitate alignment and interconnection between adjacent rails.

In the illustrated embodiment, the cleats 204 have a generally octagonal shape. Stated another way, in the illustrated embodiment each cleat 204 includes four inclined edges 220 that are oriented at an acute angle relative to the longitudinal axis 208 of the rail 200 and that substantially form a diamond shape. In other embodiments, the cleat 204 may have a profile that is a different shape (e.g., hexagonal, rectangular, an irregular polygonal shape, a curvilinear shape), and/or the cleat 204 may have a different number of inclined edges. Each of the cleats 204 is separated from an adjacent cleat by a gap or space 216. In the illustrated embodiment, partial gaps are located between the outermost cleats and the associated end of the rail 200, and the outermost cleats 204 will be spaced apart from a cleat of an adjacent panel or rail by the same distance as adjacent cleats 204 of the same rail 200. In the illustrated embodiment, the storage container 100 is supported within a gap 216 between two adjacent cleats 204. Other attachments and/or objects (not shown) may be located within the gaps 216 to engage one or more cleats 204.

Referring again to FIG. 1, the container 100 includes a first container portion 104 and a second container portion 108 that are joined together by a hinge 112. In the illustrated embodiment, the first container portion 104 and the second container portion 108 are substantially similar to one another, and the container is a clamshell-type. In other embodiments, the container portions may have different shapes—for example, one portion may provide an internal compartment for storage, and another portion may provide a lid for covering the internal compartment. In the illustrated embodiment, the hinge 112 is positioned adjacent a first side (e.g., a rear side 116) of the first container portion 104 and a first side (e.g., a rear side 120) of the second container portion 108, and the container portions 104, 108 are pivotable relative to one another about a hinge 112 between a closed position and an open position. In the closed position, a second side (e.g., a front side 134—FIG. 3) of the first container portion 104 is adjacent a second side (e.g., a front side 136) of the second container portion 108. In the open position, the second sides 134, 136 of the container portions 104, 108 are spaced apart from one another. In the illustrated embodiment, the first container portion 104 and the second container portion 108 can be releasably secured to one another in the closed position by a latch 140. In other embodiments, the container 100 may include a handle.

In the illustrated embodiment, the first container portion 104 includes first lugs 142 and the second container portion 108 includes second lugs 144 aligned with the first lugs 142. The hinge 112 includes a pin 146 extending through the first lugs 142 and the second lugs 144 along a pivot axis 148 about which the container portions 104, 106 pivot relative to one another. In other embodiments, the first container portion 104 and the second container portion 108 may be coupled to one another in a different manner.

Figure 4:
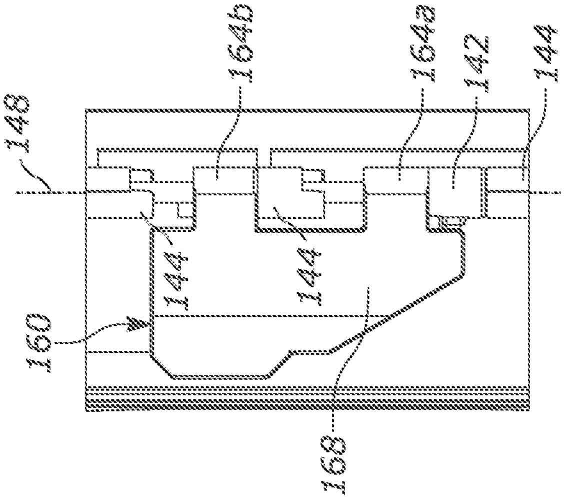
FIG. 4 is a side view of the storage container of FIG. 1, with a coupling feature in a stowed position.
Figure 7:
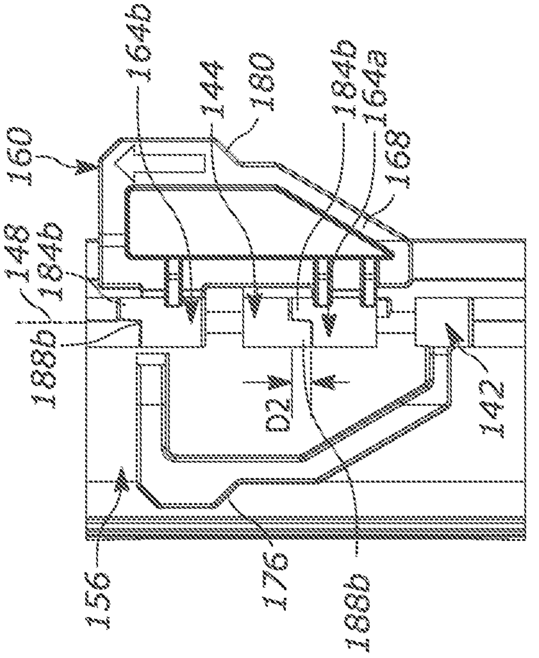
FIG. 7 is a side view of the storage container of FIG. 1, with a coupling feature in an extended position.

The container 100 also includes a support feature 152 for coupling the container 100 to the support panel 200. The support feature 152 includes a first partial mounting portion 156 and a second partial mounting portion 160. The first partial mounting portion 156 is positioned on one side of the first container portion 104 (e.g., the rear side 116). In the illustrated embodiment, the first partial mounting portion 156 is formed integrally with the rear side 116. In other embodiments, the first partial mounting portion 156 may be coupled to the rear side 116 in a different manner. The second partial mounting portion 160 is supported for pivoting movement relative to the first partial mounting portion 156 between a stowed position (FIG. 4) and an extended position (FIG. 7). In the illustrated embodiment, the second partial mounting portion 160 is supported for pivoting movement on the hinge pin 146.

Figure 5:
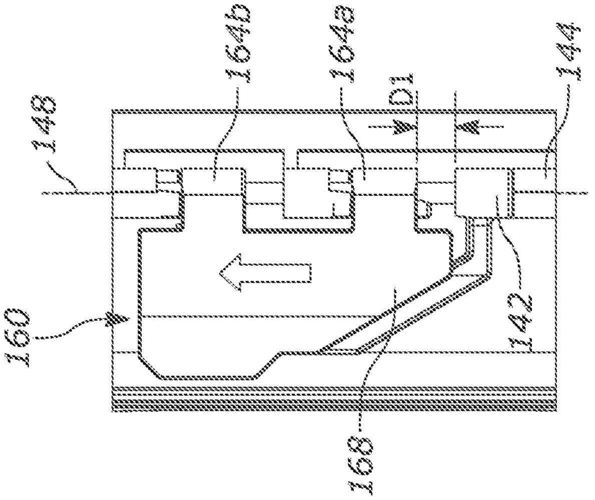
FIG. 5 is a side view of the storage container of FIG. 1, with a coupling feature in a second position.
Figure 6:
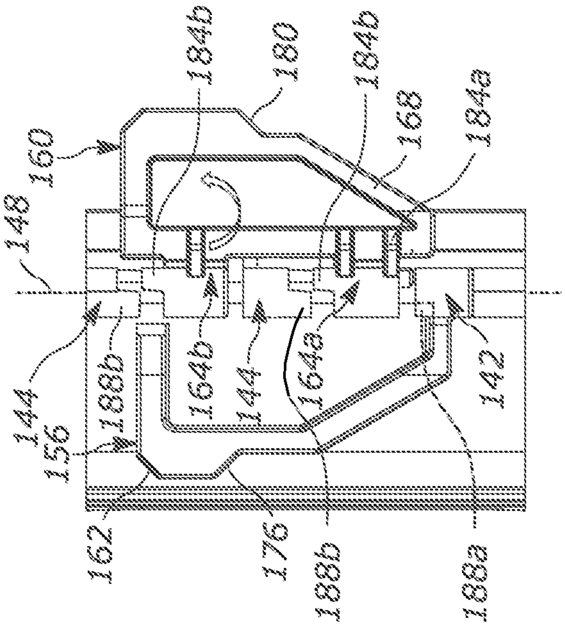
FIG. 6 is a side view of the storage container of FIG. 1, with a coupling feature in a third position.

As shown in FIG. 1, the first partial mounting portion 156 includes a first flange 162, and the second partial mounting portion 160 includes a collar 164 and a second flange 168 protruding from the collar 164. In the illustrated embodiment, the collar 164 is coupled to and movable relative to the hinge pin 146. The collar 164 is both pivotable about the pivot axis 148 and is also slidable in a direction parallel to the pivot axis 148. While in the stowed position (shown in FIG. 4), the second partial mounting portion 160 is positioned adjacent and coupled to the first partial mounting portion 156 (FIG. 6). In the illustrated embodiment, the second partial mounting portion 160 slides a first distance D1 in a direction parallel to the pivot axis 148, as shown in FIG. 5. The second partial mounting portion 160 is then rotated about the pivot axis 148, as shown in FIG. 6. In some embodiments, the second partial mounting portion 160 is rotated so that the second flange 168 is diametrically opposite the first partial mounting portion 156. As shown in FIG. 7, the second partial mounting portion 160 then slides a second distance D2 in a direction parallel to the pivot axis 148 to the extended position.

As shown in FIG. 6, the first partial mounting portion 156 includes a first edge 176 oriented at an acute angle relative to the pivot axis 148. The second partial mounting portion 160 includes a second edge 180 oriented at an acute angle relative to the pivot axis 148. In the extended position, the first edge 176 and the second edge 180 are positioned at the same location along the pivot axis 148. As a result, the first edge 176 and the second edge 180 are positioned to engage the angled edges of adjacent cleats 204 (FIG. 2) of the panel 200 when the support feature 152 is positioned in the gap 216 between the cleats 204. The container 100 can be coupled to the panel 200 by aligning the support feature 152 between two cleats 204 and moving the container 100 downwardly until the first edge 176 and the second edge 180 engage the cleats 204.

In some embodiments, the collar 164 includes two portions 164*a*, 164*b*, and each side of the collar portions 164*a*, 164*b* includes protrusions (e.g., castellations 184*a*, 184*b*) that extend parallel to the pivot axis 148. Similarly, at least one of the lugs 142, 144 includes slots (e.g., castellations 188*a*, 188*b*) that are complementary with the collar castellations 184*a*, 184*b*. In the stowed position, one of the collar castellations 184*a* engages a first one of the lug castellations 188*a*. In the extended position, other collar castellations (e.g., castellations 184*b* protruding from an opposite side of the collar portions 164*a*, 164*b*) engage one of more second lug castellations 188*b*. The depth of the castellations 184*a*, 188*a* may correspond to the first distance D1, and the depth of the castellations 184*b*, 188*b* may correspond to the second distance D2. The engagement of the collar castellations

184*a*, 184*b* and lug castellations 188*a*, 188*b* inhibits undesired rotation, requiring a user to translate the second partial mounting portion 160 along the axis 148 before rotating it. In some embodiments, a detent may be provided to inhibit undesired translational movement of the second partial mounting portion 160 along the axis 148.

Although aspects of the disclosure have been described in detail with reference to certain preferred embodiments, variations and modifications exist within the scope and spirit of one or more independent aspects as described.

The invention claimed is:

1. A storage container comprising:

a first container portion including a first side;

a second container portion including a second side, the second side pivotably coupled to the first side of the first container portion by a hinge, the second container portion and the first container portion being pivotably movable between a closed position and an open position; and a support feature configured to engage a wall support system, the support feature including a first partial mounting portion and a second partial mounting portion, the first partial mounting portion positioned on the first container portion, the second partial mounting portion supported for movement relative to the first partial mounting portion, the second partial mounting portion movable between a stowed position and an extended position, the first partial mounting portion and the second partial mounting portion cooperating to provide a mounting interface configured to engage a support member while the second partial mounting portion is in the extended position, wherein the first partial mounting portion extends from the first container portion when the second partial mounting portion is in the extended position.

2. The storage container of claim 1, wherein the first partial mounting portion includes a first edge and the second partial mounting portion includes a second edge, the first edge oriented at an acute angle relative to a pivot axis of the hinge, the second edge oriented at an acute angle relative to the pivot axis of the hinge.

3. The storage container of claim 1, wherein the second partial mounting portion is coupled to the hinge and supported for movement independently of the first container portion and the second container portion.

4. The storage container of claim 1, wherein the second partial mounting portion is removably coupled to the first partial mounting portion while the second partial mounting portion is in the stowed position.

5. The storage container of claim 1, wherein the second partial mounting portion is both slidable in a direction parallel to a pivot axis of the hinge and is pivotable about the pivot axis.

6. The storage container of claim 2, wherein the first container portion includes a hinge includes a pin coupling the first container portion and the second container portion, wherein the second partial mounting portion includes a collar and a flange protruding from the collar, the collar pivotably coupled to the pin, the flange including the second edge.

7. The storage container of claim 6, wherein the collar includes a castellation that is selectively engageable with a complementary castellation positioned on one of the first container portion and the second container portion, wherein engagement between the collar castellation and the complementary castellation secures the second partial mounting portion against pivoting movement about a pivot axis of the hinge.

8. The storage container of claim 1, further comprising a latch for selectively securing the second container portion and the first container portion in the closed position.

9. A storage system comprising:

a panel secured to a support surface, the panel including a plurality of cleats spaced apart from one another; and a storage container removably supported on the panel, the storage container including, a first container portion including a first side;

a second container portion including a second side, the second side pivotably coupled to the first side of the first container portion by a hinge, the second container portion and the first container portion being pivotably movable between a closed position and an open position; and a support feature engageable with the cleats, the support feature including a first partial mounting portion and a second partial mounting portion, the first partial mounting portion positioned on the first container portion, the second partial mounting portion supported for movement relative to the first partial mounting portion, the second partial mounting portion movable between a stowed position and an extended position, the first partial mounting portion and the second partial mounting portion cooperating to provide a mounting interface to engage at least one of the cleats while the second partial mounting portion is in the extended position, wherein the first partial mounting portion extends from the first container portion when the second partial mounting portion is in the extended position.

10. The storage system of claim 9, wherein adjacent cleats are spaced apart from one another by a gap, wherein the support feature is positioned between two adjacent cleats, the first partial mounting portion engaging one of the cleats and the second partial mounting portion engaging an adjacent one of the cleats.

11. The storage system of claim 9, wherein the support feature remains engaged with at least one of the cleats due to gravity.

12. The storage system of claim 9, wherein the first partial mounting portion includes a first edge and the second partial mounting portion includes a second edge, the first edge oriented at an acute angle relative to a pivot axis of the hinge, the second edge oriented at an acute angle relative to the pivot axis of the hinge.

13. The storage system of claim 9, wherein the second partial mounting portion is coupled to the hinge and supported for movement independently of the first container portion and the second container portion.

14. The storage system of claim 9, wherein the second partial mounting portion is removably coupled to the first partial mounting portion while the second partial mounting portion is in the stowed position.

15. The storage system of claim 9, wherein the second partial mounting portion is both slidable in a direction parallel to a pivot axis of the hinge and is pivotable about the pivot axis.

16. The storage system of claim 12, wherein the first container portion includes a hinge includes a pin coupling the first container portion and the second container portion, wherein the second partial mounting portion includes a collar and a flange protruding from the collar, the collar pivotably coupled to the pin, the flange including the second edge.

17. The storage system of claim 16, wherein the collar includes a castellation that is selectively engageable with a complementary castellation positioned on one of the first container portion and the second container portion, wherein engagement between the collar castellation and the complementary castellation secures the second partial mounting portion against pivoting movement about a pivot axis of the hinge.

18. A storage container comprising:

a first container portion;

a second container portion;

a hinge coupling a first side of the first container portion and a second side of the second container portion for pivoting movement about a pivot axis, the first container portion and the second container portion pivotably movable between a closed position and an open position;

a latch releasably securing the first container portion and the second container portion in the closed position;

a first partial mounting portion positioned on the first container portion; and a second partial mounting portion supported on the hinge for pivoting movement relative to the first partial mounting portion and the second container portion, the second partial mounting portion movable between a stowed position and an extended position, the first partial mounting portion and the second partial mounting portion cooperating to form a mounting interface while the first container portion and the second container portion are in the closed position and the second partial mounting portion is in the extended position, the mounting interface configured to engage a wall support system, wherein the first partial mounting portion extends from the first container portion when the second partial mounting portion is in the extended position.

19. The storage container of claim 18, wherein the second partial mounting portion is both slidable in a direction parallel to the pivot axis and is pivotable about the pivot axis.

20. The storage container of claim 18, wherein the first container portion includes a hinge includes a pin coupling the first container portion and the second container portion, wherein the second partial mounting portion includes a collar and a flange protruding from the collar, the collar pivotably coupled to the pin.

21. The storage container of claim 20, wherein the collar includes a castellation that is selectively engageable with a complementary castellation positioned on one of the first container portion and the second container portion, wherein engagement between the collar castellation and the complementary castellation secures the second partial mounting portion against pivoting movement about the pivot axis.

* * * * *